(12) United States Patent
Yu et al.

(10) Patent No.: US 11,928,432 B2
(45) Date of Patent: Mar. 12, 2024

(54) MULTI-MODAL PRE-TRAINING MODEL ACQUISITION METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Fei Yu, Beijing (CN); Jiji Tang, Beijing (CN); Weichong Yin, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 455 days.

(21) Appl. No.: 17/319,189

(22) Filed: May 13, 2021

(65) Prior Publication Data
US 2022/0019744 A1    Jan. 20, 2022

(30) Foreign Application Priority Data

Jul. 14, 2020   (CN) .......................... 202010676107.3

(51) Int. Cl.
*G06F 40/30*       (2020.01)
*G06F 40/284*      (2020.01)
(Continued)

(52) U.S. Cl.
CPC ............ *G06F 40/284* (2020.01); *G06F 40/30* (2020.01); *G06N 5/04* (2013.01); *G06N 20/00* (2019.01); *G06V 10/811* (2022.01); *G06V 20/30* (2022.01)

(58) Field of Classification Search
CPC ........ G06F 40/30; G06F 40/00; G06F 40/131; G06F 40/186; G06F 40/20; G06F 40/205;
(Continued)

(56) References Cited

U.S. PATENT DOCUMENTS

2018/0268548 A1   9/2018  Zhe et al.
2020/0097604 A1*  3/2020  Lee .......................... G06N 3/08
2021/0056742 A1*  2/2021  Sikka ...................... G06F 16/51

FOREIGN PATENT DOCUMENTS

CN   108304911 A    7/2018
CN   110442684 A   11/2019
(Continued)

OTHER PUBLICATIONS

Li et al., "Unicoder-VL: A Universal Encoder for Vision and Language by Cross-Modal Pre-Training", thirty-fourth AAAI conference, Feb. 7-12, 2020.*
(Continued)

*Primary Examiner* — Qi Han
(74) *Attorney, Agent, or Firm* — Brooks Kushman P.C.

(57) ABSTRACT

A multi-modal pre-training model acquisition method, an electronic device and a storage medium, which relate to the fields of deep learning and natural language processing, are disclosed. The method may include: determining, for each image-text pair as training data, to-be-processed fine-grained semantic word in the text; masking the to-be-processed fine-grained semantic words; and training the multi-modal pre-training model using the training data with the fine-grained semantic words masked.

11 Claims, 4 Drawing Sheets

(51) Int. Cl.
*G06N 5/04* (2023.01)
*G06N 20/00* (2019.01)
*G06V 10/80* (2022.01)
*G06V 20/30* (2022.01)

(58) Field of Classification Search
CPC ......... G06F 40/211; G06F 40/279–295; G06F 40/35; G06F 40/40; G06F 40/45; G06F 40/55; G06F 40/56
USPC ...................................... 704/1, 9, 4, 10, 257
See application file for complete search history.

(56) References Cited

FOREIGN PATENT DOCUMENTS

| | | |
|---|---|---|
| CN | 110688857 A | 1/2020 |
| CN | 110705301 A | 1/2020 |
| CN | 111078844 A | 4/2020 |
| CN | 111144108 A | 5/2020 |
| CN | 111339774 A | 6/2020 |
| CN | 112668671 A | 4/2021 |
| JP | 2019079357 A | 5/2019 |
| JP | 2019125364 A | 7/2019 |

OTHER PUBLICATIONS

Gao et al., Machine Translation as English version of a Chinese patent application: IDS: CN 111144108, publication date: May 12, 2020.*

Search Report of Chinese Application No. 202010676107.3 dated Sep. 26, 2021, 2 pages.

Yu et al., "ERNIE-VIL: Knowledge Enhanced Vision-Language Representations through Scene Graphs", retrieved from Internet: https://arxiv.org/abs/2006.16934v1, Mar. 19, 2021, 9 pages.

Chinese Search Report dated Jul. 14, 2020 for related Chinese Appln. No. 2020106761073; 3 Pages.

Chinese Office Action dated Mar. 4, 2021, for related Chinese Appln. No. 2020106761073; 7 Pages.

Extended European Search Report of European patent application No. 21173093.2 dated Nov. 4, 2021, 8 pages.

Yu et al., "Ernie-Vi L: Knowledge Enhanced Vision-Language Representations Through Scene Graph", arxiv.org, Cornell University Library, 201 Olin Library Cornell University Ithaca, NY 14853, Jun. 30, 2020 (Jun. 30, 2020), XP081701129.

Li, et al., "Oscar: Object-Semantics Aligned Pre-training for Vision-Language Tasks", In: "Advances in Cryptology—CRYPTO 2013", Apr. 13, 2020 (Apr. 13, 2020), Springer Berlin Heidelberg 032528, XP055854484, ISSN: 0302-9743, pp. 121-137, DOI: 10.1007/978-3-030-58577-8 8, Retrieved from the Internet: URL:https://arxiv.org/pdf/2004.06165vl.pdf>.

Hu et al., "VIVO : Surpassing Human Performance in Novel Object Captioning with Visual Vocabulary Pre-Training", Sep. 28, 2020 (Sep. 28, 2020), XP055854501, Retrieved from the Internet: URL:https://arxiv.org/pdf/2009.13682vl.pdf>, [retrieved on Oct. 25, 2021].

Yu et al., Ernie-ViL: Knowledge Enhanced Vision-Language Representations through Scene Graphs, Association for Advancement of Artificial Intelligence, arXiv:2006.16934v3 [cs.CV] Mar. 19, 2021, 9 pages.

Cross-modal Bert: Acquisition and mutual prediction of multimodal information representation by self-attention, The 34th Annual Conference of the Japanese Society for Artificial Intelligence (2020) [online], Japan, General The Japanese Society for Artificial Intelligence, Jun. 19, 2020, 10 pages.

* cited by examiner

MULTI-MODAL PRE-TRAINING MODEL ACQUISITION METHOD, ELECTRONIC DEVICE AND STORAGE MEDIUM

CROSS-REFERENCE TO RELATED APPLICATIONS

The present disclosure claims the priority and benefit of Chinese Patent Application No. 202010676107.3, filed on Jul. 14, 2020, entitled "MULTI-MODAL PRE-TRAINING MODEL ACQUISITION METHOD AND APPARATUS, ELECTRONIC DEVICE AND STORAGE MEDIUM." The disclosure of the above application is incorporated herein by reference in its entirety.

TECHNICAL FIELD

The present disclosure relates to computer application technologies, particularly to the fields of deep learning and natural language processing (NLP), and more particularly to a multi-modal pre-training model acquisition method, an electronic device and a storage medium.

BACKGROUND

In recent years, the learning paradigm of pre-training large-scale data to learn generic semantic representation and fine-tuning various downstream tasks has been widely applied to the field of NLP.

Many real scenes involve information of multiple modes at the same time, for example, image-text pre-training models and the like gradually attract attention. A current multi-modal pre-training model generally uses aligned image-text pairs (corpus) for training, without distinguishing common words and fine-grained semantic words in the text, which leads to a poor training effect of the model.

SUMMARY

Embodiments of the present disclosure provide a multi-modal pre-training model acquisition method, an electronic device and a storage medium.

According to an embodiment, a multi-modal pre-training model acquisition method includes: determining, for each image-text pair as training data, to-be-processed fine-grained semantic words in the text; masking the to-be-processed fine-grained semantic words; and training the multi-modal pre-training model using the training data with the fine-grained semantic words masked.

According to an embodiment, an electronic device includes: at least one processor; and a memory in communication connection with the at least one processor; and the memory stores instructions executable by the at least one processor, and the instructions are executed by the at least one processor to enable the at least one processor to perform the method as described above.

According to an embodiment, a non-transitory computer-readable storage medium includes instructions, which, when executed by a computer, cause the computer to carry out the method as described above.

It shall be understood that the content described in this part is neither intended to identify key or important features of embodiments of the present disclosure and nor intended to limit the scope of the present disclosure.

BRIEF DESCRIPTION OF THE DRAWINGS

The accompanying drawings are intended to better understand the solution and do not constitute limitations on the present disclosure. In the drawings.

DETAILED DESCRIPTION

Exemplary embodiments of the present disclosure are described below with reference to the accompanying drawings, including various details of the embodiments of the present disclosure to facilitate understanding, and should be considered as exemplary only. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In addition, it shall be understood that the word "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
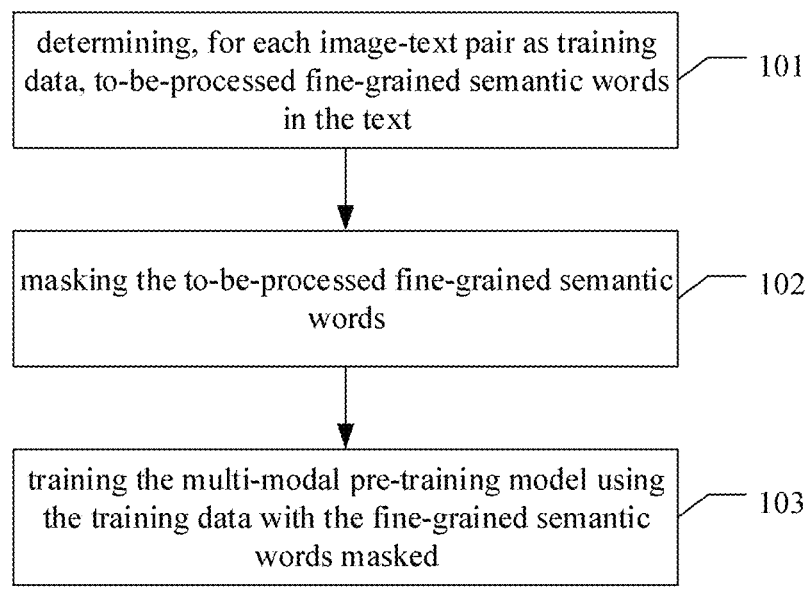
FIG. 1 is a flow chart of a multi-modal pre-training model acquisition method according to an embodiment of the present disclosure.

FIG. 1 is a flow chart of a multi-modal pre-training model acquisition method according to an embodiment of the present disclosure. As shown in FIG. 1, following specific implementations are included.

In 101, determining, for each image-text pair as training data, to-be-processed fine-grained semantic words in the text.

Generally, there are a plurality of to-be-processed fine-grained semantic words (also may be referred to as tokens).

In 102, masking the to-be-processed fine-grained semantic words.

The fine-grained semantic words in the text may be replaced with special characters or other random tokens by masking, and the specific manner is not limited.

In 103, training the multi-modal pre-training model using the training data with the fine-grained semantic words masked.

The multi-modal pre-training model may be trained by using the training data after masking the fine-grained semantic words.

Common words and fine-grained semantic words in text are not distinguished during training of an existing multi-modal pre-training model. Generally, some words may be randomly selected for masking, and the selected words are likely to be some common words with little meaning, thereby reducing a model training effect.

The fine-grained semantic words are important words containing key information to distinguish different scenes. The fine-grained semantic words may include entity words, attribute words and relationship words, which are crucial for cross-modal alignment.

In the above embodiment, the model can learn fine-grained semantic words, thereby improving model training effects, model performance and the like.

As described in 101, for any/each image-text pair as training data, to-be-processed fine-grained semantic words in the text may be determined first. The to-be-processed fine-grained semantic words may include: entity words, attribute words and relationship words, and the attribute represents the attribute of each entity, and the relationship represents the relationship between entities.

For example, the text in the image-text pair is "A woman in a blue dress is putting her little white cat on top of a brown car in front of her house", here the entity words may include "woman", "cat", "dress", "car" and "house", the attribute words may include "blue", "white", "little" and "brown", and the relationship words may include "in", "putting", "on top of" and "in front of".

A scene graph corresponding to the text may be acquired, and the to-be-processed fine-grained semantic words are determined according to the acquired scene graph. The scene graph may be parsed from the text by using an existing Scene Graph Parser technology.

The scene graph may include: entity nodes (O), attribute tuples (E) and relationship triples (K), each attribute tuple is composed of one entity node and one attribute node, and each relationship triple is composed of two entity nodes and one relationship node. The entity nodes may correspond to the entity words in the text, the attribute nodes may correspond to the attribute words in the text, and the relationship nodes may correspond to the relationship words in the text. For example, for the text "A woman in a blue dress is putting her little white cat on top of a brown car in front of her house", the entity nodes in the corresponding scene graph may include "woman", "cat", "dress", "car" and "house", the attribute tuples may include "blue dress", "white cat", "little cat" and "brown car", and the relationship triples may include "woman in dress", "woman putting cat", "cat on-top-of car" and "car in-front-of house".

Figure 2:
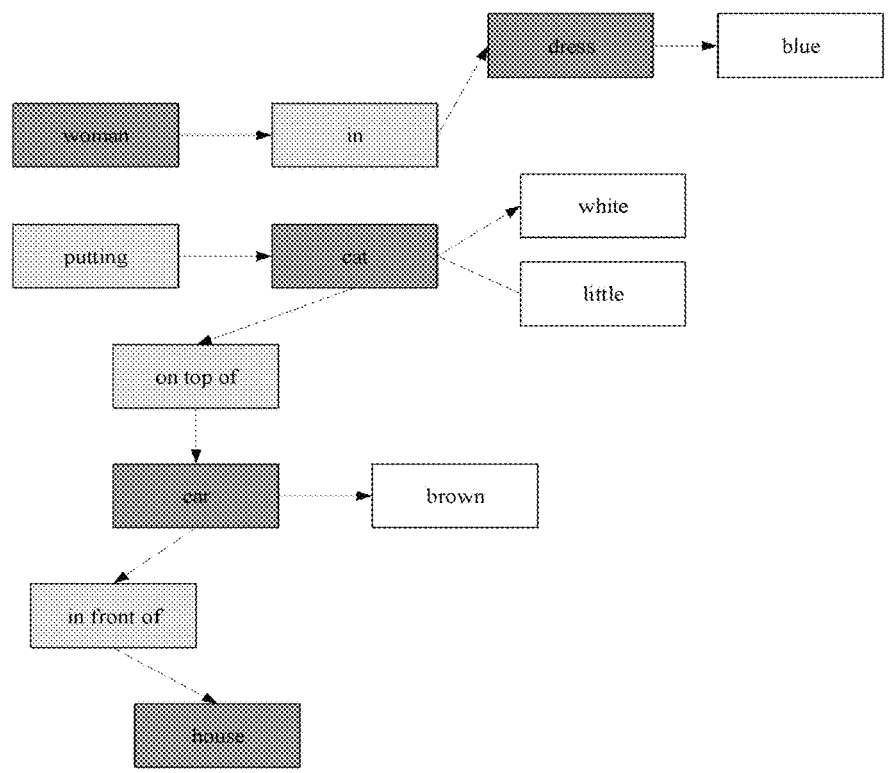
FIG. 2 is a schematic diagram of three kinds of nodes included in a scene graph according to an embodiment of the present disclosure.

FIG. 2 is a schematic diagram of three kinds of nodes included in a scene graph according to an embodiment of the present disclosure. As shown in FIG. 2, the corresponding text is "A woman in a blue dress is putting her little white cat on top of a brown car in front of her house".

When the to-be-processed fine-grained semantic words are determined according to the scene graph, a predetermined number of entity nodes, attribute tuples and relationship triples may be selected from the scene graph, and then entity words in the text corresponding to the selected entity nodes, attribute words in the text corresponding to attribute nodes in the selected attribute tuples and relationship words in the text corresponding to relationship nodes in the selected relationship triples may be taken as the to-be-processed fine-grained semantic words.

The number of nodes to be selected may be determined according to the total number of nodes included in the scene graph as the predetermined number; and the predetermined number of entity nodes, attribute tuples and relationship triples are randomly selected from the scene graph. For example, the total number of nodes included in the scene graph multiplied by 30% may be calculated, and the calculation result after rounding down or up may be taken as the number of the nodes to be selected, that is, the predetermined number.

As described above, entity words in the text corresponding to the selected entity nodes, attribute words in the text corresponding to attribute nodes in the selected attribute tuples and relationship words in the text corresponding to relationship nodes in the selected relationship triples may be taken as the to-be-processed fine-grained semantic words.

Figure 3:
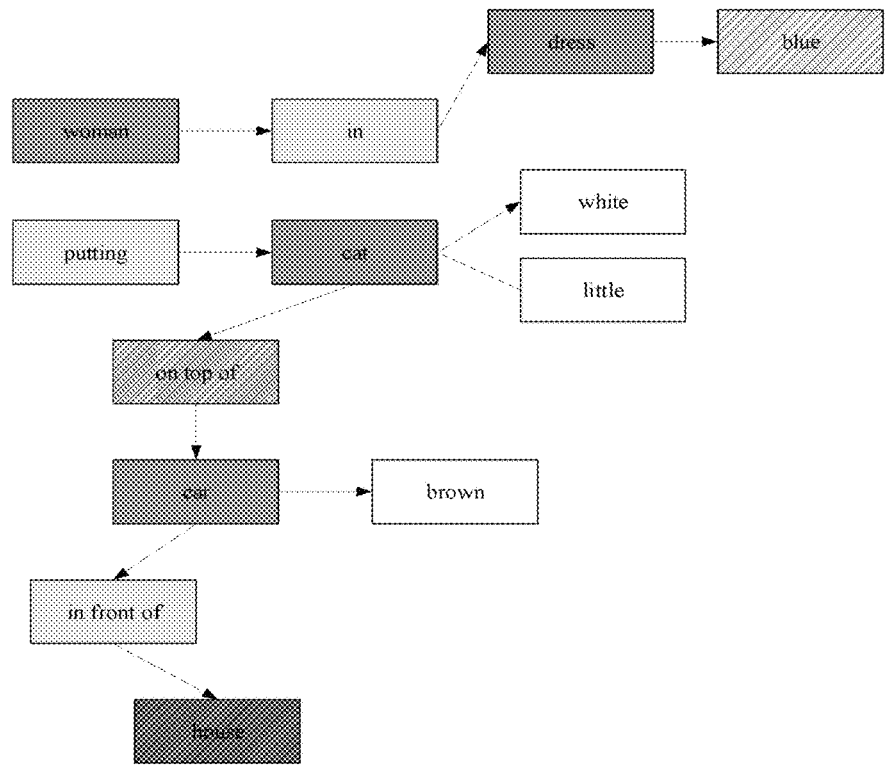
FIG. 3 is a schematic diagram of nodes selected from a scene graph according to an embodiment of the present disclosure.

FIG. 3 is a schematic diagram of nodes selected from a scene graph according to an embodiment of the present disclosure. As shown in FIG. 3, it is assumed that the selected nodes include "blue", "house" and "on top of", which are an attributed node, an entity node and a relationship node respectively.

It may be seen that with the scene graph, the to-be-processed fine-grained semantic words can be acquired conveniently and accurately, and structured knowledge in the scene graph can be integrated into the training of the multi-modal pre-training model, thereby further improving the model training effects, the model performance and the like.

Figure 4:
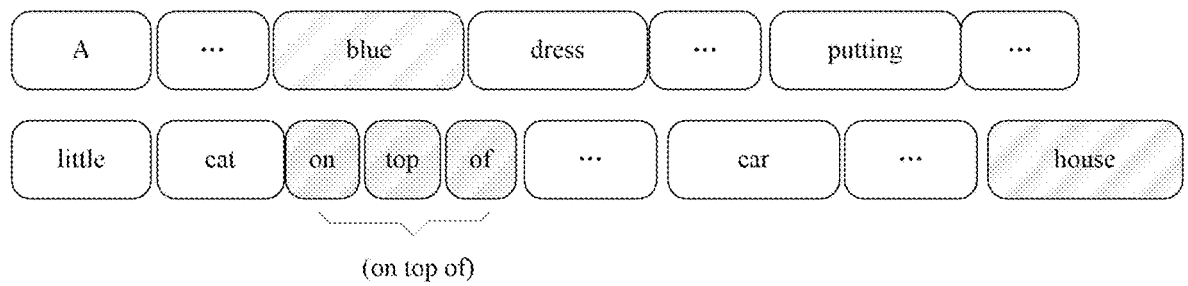
FIG. 4 is a schematic diagram after masking of the text according to an embodiment of the present disclosure.

As described in 102, the to-be-processed fine-grained semantic words in the text may be masked. How to perform masking is the prior art. By masking, the to-be-processed fine-grained semantic words in the text may be replaced with special characters [MASK] or other random tokens. FIG. 4 is a schematic diagram after masking of the text according to an embodiment of the present disclosure. As shown in FIG. 4, the to-be-processed fine-grained semantic words "blue", "house" and "on top of" in the text may be masked respectively.

Further, as described in 103, a multi-modal pre-training model may be further trained using the training data with the fine-grained semantic words masked. Corresponding to types of the masked words, training tasks of the multi-modal pre-training model may include: entity prediction, attribute prediction and relationship prediction.

The multi-modal pre-training model may predict masked words in the text according to a context of the text and corresponding image content, that is, the masked words are restored. Then, the predicted words can be compared with real words (i.e., original words in the text), and model parameters may be updated according to comparison results.

It is to be noted that in the present disclosure, the training of the multi-modal pre-training model is not limited to the entity prediction, the attribute prediction and the relationship prediction. Generally, other training tasks, such as an existing masked region prediction task, may be further included. In addition, an image-text matching task may be further introduced to model multi-modal representation.

Figure 5:
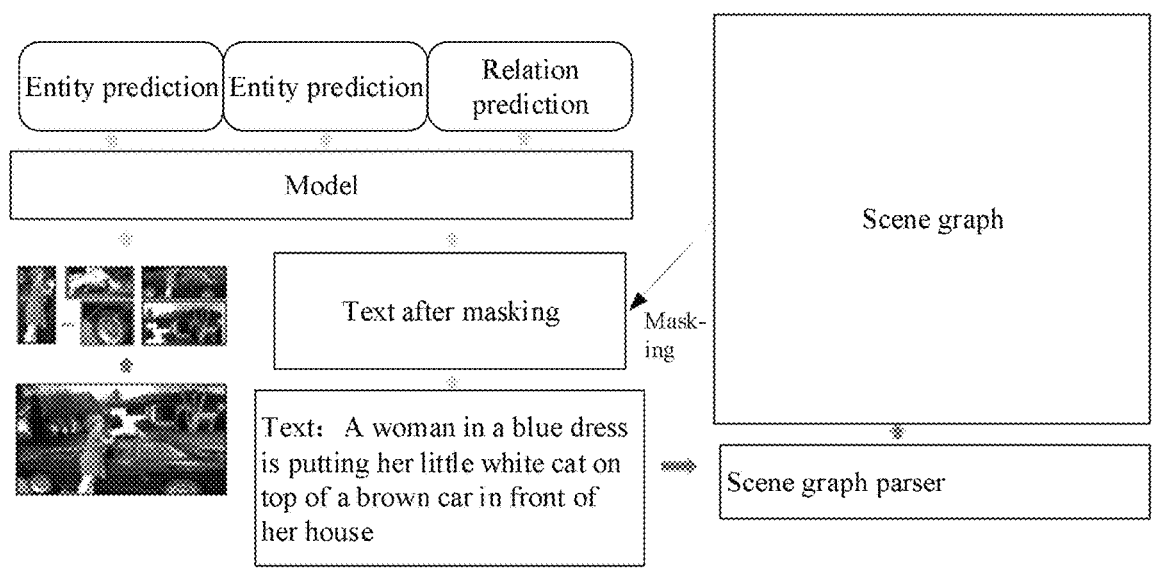
FIG. 5 is a schematic diagram of a process of acquiring a multi-modal pre-training model according to an embodiment of the present disclosure.

Based on the above introduction, FIG. 5 is a schematic diagram of a process of acquiring a multi-modal pre-training model according to an embodiment of the present disclosure. As shown in FIG. 5, assuming that the text in the image-text pair is "A woman in a blue dress is putting her little white cat on top of a brown car in front of her house", the corresponding image is shown in the lower left corner of FIG. 5, a scene graph may be parsed for the text "A woman in a blue dress is putting her little white cat on top of a brown car in front of her house", and three nodes "blue", "house" and "on top of" may be randomly selected from the scene graph. Correspondingly, the to-be-processed fine-grained semantic words "blue", "house" and "on top of" in the text may be masked. As shown in FIG. 4, the multi-modal pre-training model may be trained by taking entity prediction, attribute prediction and relationship prediction as training tasks.

After the completion of the training of the multi-modal pre-training model, for any/each downstream task, the multi-modal pre-training model may also be fine-tuned according to the training data corresponding to the downstream task.

Taking a visual question-and-answer downstream task as an example, visual question-and-answer refers to a given image and a question, the answer is given by the model. Characteristics of the downstream task may be continuously learned based on initialization of the multi-modal pre-training model, and training data corresponding to the downstream task is used for fine tuning.

Since the amount of data in the downstream task is usually small, the effect of each downstream task can be significantly improved based on semantic information learned by the multi-modal pre-training model.

It is to be noted that, for ease of description, the foregoing method embodiment is described as a series of action combinations. However, those skilled in the art should understand that the embodiments of the present disclosure are not limited to the sequence of actions described, as some steps may be performed in another sequence or simultaneously according to the present disclosure. Next, those skilled in the art should also understand that the embodiments described in this specification are merely exemplarily, and actions and modules involved are not necessarily mandatory to the present disclosure.

The above is an introduction to the method embodiment, and the following is a further description of the solution according to the present disclosure through an apparatus embodiment.

Figure 6:
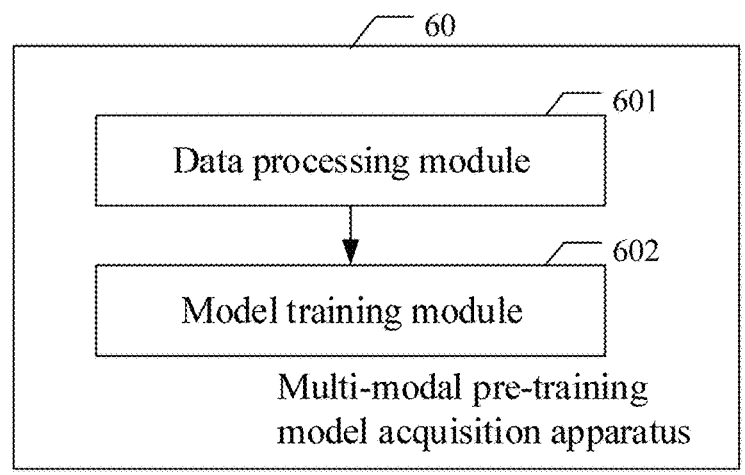
FIG. 6 is a schematic diagram of a composition structure of a multi-modal pre-training model acquisition apparatus 60 according to an embodiment of the present disclosure.

FIG. 6 is a schematic diagram of a composition structure of a multi-modal pre-training model acquisition apparatus 60 according to an embodiment of the present disclosure. As shown in FIG. 6, a data processing module 601 and a model training module 602 are included.

The data processing module 601 is configured to determine, for each image-text pair as training data, to-be-processed fine-grained semantic words in the text, and mask the to-be-processed fine-grained semantic words.

The model training module 602 is configured to train the multi-modal pre-training model using the training data with the fine-grained semantic words masked.

There are generally a plurality of to-be-processed fine-grained semantic words, which may include: entity words, attribute words and relative words, herein the attributes represents the attribute of each entity, and the relationship represents the relationship between entities.

The data processing module 601 may acquire a scene graph corresponding to the text, and determine the to-be-processed fine-grained semantic words according to the acquired scene graph.

The scene graph may include: entity nodes, attribute tuples and relationship triples, each attribute tuple is composed of one entity node and one attribute node, and each relationship triple is composed of two entity nodes and one relationship node.

The data processing module 601 may select a predetermined number of entity nodes, attribute tuples and relationship triples from the scene graph, and take entity words in the text corresponding to the selected entity nodes, attribute words in the text corresponding to attribute nodes the selected attribute tuples and relationship words in the text corresponding to relationship words in the selected relationship triples as the to-be-processed fine-grained semantic words.

The data processing module 601 may determine the number of nodes to be selected according to the total number of nodes included in the scene graph as the predetermined number, and randomly select the predetermined number of entity nodes, attribute tuples and relationship triples from the scene graph. For example, the total number of nodes included in the scene graph multiplied by 30% may be calculated, and the calculation result rounding down or up may be taken as the number of the nodes to be selected, that is, the predetermined number.

The data processing module 601 may further mask the to-be-processed fine-grained semantic words in the text. The to-be-processed fine-grained semantic words may be replaced with special characters or other random tokens by masking.

The model training module 602 may train the multi-modal pre-training model using the training data with the fine-grained semantic words masked. Corresponding to types of the masked words, training tasks of the multi-modal pre-training model include: entity prediction, attribute prediction and relationship prediction. The multi-modal pre-training model may predict masked words in the text according to a context of the text and corresponding image content, that is, the masked words are restored. The predicted words can be compared with real words, and model parameters may be updated according to comparison results.

The model training module 602 may further fine-tune, for any/each downstream task, the multi-modal pre-training model according to the training data corresponding to the downstream task.

The specific workflow of the apparatus embodiment shown in FIG. 6 can be obtained with reference to the related description in the above method embodiment and is not repeated.

In conclusion, by the technical solution in the apparatus embodiment of the present disclosure, the model can learn to-be-processed fine-grained semantic words, and can integrate structured knowledge in a scene graph into the training of the multi-modal pre-training model, thereby improving model training effects, model performance and the like.

According to an embodiment of the present disclosure, an electronic device and a readable storage medium are proposed.

Figure 7:
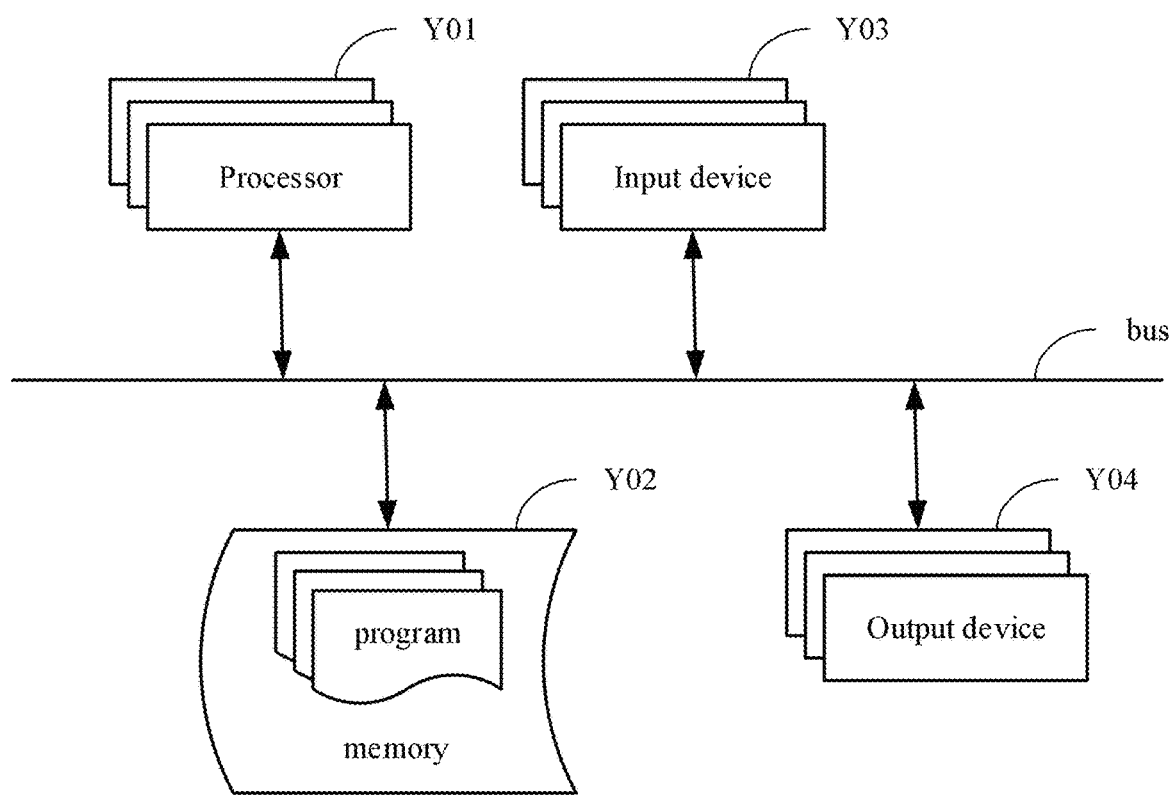
FIG. 7 is a block diagram of an electronic device for the method according to an embodiment of the present disclosure.

As shown in FIG. 7, it is a block diagram of an electronic device for a method according to an embodiment of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital processing, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the electronic device includes: one or more processors Y01, a memory Y02, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output device (such as a display device coupled to the interfaces). In other implementations, a plurality of processors and/or buses may be used together with a plurality of memories and a plurality of memories, if necessary. Similarly, a plurality of electronic devices may be connected, each of which provides some necessary operations (for example, as a server array, a set of blade servers, or a multiprocessor system). One processor Y01 is taken as an example is FIG. 7.

The memory Y02 is the non-instantaneous computer-readable storage medium according to the present disclosure. The memory stores instructions executable by at least one processor to make the at least one processor perform the method according to the present disclosure. The non-instantaneous computer-readable storage medium according to the present disclosure stores computer instructions. The computer instructions are used to make a computer perform the method according to the present disclosure.

The memory Y02, as a non-instantaneous computer-readable storage medium, may be configured to store non-instantaneous software programs, non-instantaneous computer executable programs and modules, for example, program instructions/modules corresponding to the method in the embodiment of the present disclosure. The processor Y01 runs the non-instantaneous software programs, instructions and modules stored in the memory Y02 to execute various functional applications and data processing of a server, that is, to implement the method in the above method embodiment.

The memory Y02 may include a program storage area and a data storage area. The program storage area may store an operating system and an application required by at least one function; and the data storage area may store data created according to use of the electronic device. In addition, the memory Y02 may include a high-speed random access memory, and may further include a non-instantaneous memory, for example, at least one disk storage device, a flash memory device, or other non-instantaneous solid-state storage devices. In some embodiments, the memory Y02 optionally includes memories remotely disposed relative to the processor Y01. The remote memories may be connected to the electronic device over a network. Examples of the network include, but are not limited to, the Internet, intranets, blockchain networks, local area networks, mobile communication networks and combinations thereof.

The electronic device may further include: an input device Y03 and an output device Y04. The processor Y01, the memory Y02, the input device Y03 and the output device Y04 may be connected through a bus or in other manners. In FIG. 7, the connection through a bus is taken as an example.

The input device Y03 may receive input numerical information or character information, and generate key signal input related to user setting and function control of the electronic device, for example, input devices such as a touch screen, a keypad, a mouse, a trackpad, a touch pad, a pointer, one or more mouse buttons, a trackball, and a joystick. The output device Y04 may include a display device, an auxiliary lighting device and a tactile feedback device (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input device and at least one output device, and transmit the data and the instructions to the storage system, the at least one input device and the at least one output device.

The computing programs (also referred to as programs, software, software applications, or code) include machine instructions for programmable processors, and may be implemented by using high-level procedural and/or object-oriented programming languages, and/or assembly/machine languages. As used herein, the words "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The word "machine-readable signal" refers to any signal for providing the machine instructions and/or data to the programmable processor.

To provide interaction with a user, the systems and technologies described here can be implemented on a computer. The computer has: a display device (e.g., a cathode-ray tube or a liquid crystal display monitor) for displaying information to the user; and a keyboard and a pointing device (e.g., a mouse or trackball) through which the user may provide input for the computer. Other kinds of devices may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network, a wide area network, a blockchain network and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and VPS services.

One or more embodiments in the present disclosure has the following advantages or beneficial effects: the model can learn fine-grained semantic words which are crucial for cross-modal alignment, thereby improving model training effects, model performance and the like.

It shall be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A multi-modal pre-training model acquisition method, comprising:
   determining, for each image-text pair as training data, to-be-processed fine-grained semantic words in the text;
   masking the to-be-processed fine-grained semantic words; and
   training the multi-modal pre-training model using the training data with the fine-grained semantic words masked,
   wherein determining the to-be-processed fine-grained semantic words in the text comprises:
     acquiring a scene graph corresponding to the text, wherein the scene graph comprises: entity nodes, attribute tuples and relationship triples, each attribute tuple is composed of one entity node and one attribute node, and each relationship triple is composed of two entity nodes and one relationship node;
     selecting a predetermined number of entity nodes, attribute tuples and relationship triples from the scene graph, and taking entity words in the text corresponding to the selected entity nodes, attribute words in the text corresponding to attribute nodes in the selected attribute tuples, and relationship words in the text corresponding to relationship nodes in the selected relationship triples, as the to-be-processed fine-grained semantic words.

2. The method according to claim 1, wherein the selecting the predetermined number of entity nodes, attribute tuples and relationship triples from the scene graph comprises:
   determining a number of nodes to be selected according to a total number of nodes comprised in the scene graph as the predetermined number; and randomly selecting the predetermined number of entity nodes, attribute tuples and relationship triples from the scene graph.

3. The method according to claim 1, wherein training tasks of the multi-modal pre-training model comprise: entity prediction, attribute prediction and relationship prediction; and
   wherein the multi-modal pre-training model predicts masked words in the text according to a context of the text and corresponding image content.

4. The method according to claim 1, further comprising:
   after completion of the training of the multi-modal pre-training model, fine-tuning, for any downstream task, the multi-modal pre-training model according to the training data corresponding to the downstream task.

5. An electronic device, comprising:
   at least one processor; and
   a memory in communication connection with the at least one processor; wherein
   the memory stores instructions executable by the at least one processor, and the instructions are executed by the at least one processor to enable the at least one processor to carry out a multi-modal pre-training model acquisition method, which comprises:
   determining, for each image-text pair as training data, to-be-processed fine-grained semantic words in the text;
   masking the to-be-processed fine-grained semantic words; and
   training the multi-modal pre-training model using the training data with the fine-grained semantic words masked,
   wherein determining the to-be-processed fine-grained semantic words in the text comprises:
     acquiring a scene graph corresponding to the text, wherein the scene graph comprises: entity nodes, attribute tuples and relationship triples, each attribute tuple is composed of one entity node and one attribute node, and each relationship triple is composed of two entity nodes and one relationship node;
     selecting a predetermined number of entity nodes, attribute tuples and relationship triples from the scene graph, and taking entity words in the text corresponding to the selected entity nodes, attribute words in the text corresponding to attribute nodes in the selected attribute tuples, and relationship words in the text corresponding to relationship nodes in the selected relationship triples, as the to-be-processed fine-grained semantic words.

6. The electronic device according to claim 5, wherein the selecting the predetermined number of entity nodes, attribute tuples and relationship triples from the scene graph comprises:
   determining a number of nodes to be selected according to a total number of nodes comprised in the scene graph as the predetermined number; and randomly selecting the predetermined number of entity nodes, attribute tuples and relationship triples from the scene graph.

7. The electronic device according to claim 5, wherein training tasks of the multi-modal pre-training model comprise: entity prediction, attribute prediction and relationship prediction; and
   wherein the multi-modal pre-training model predicts masked words in the text according to a context of the text and corresponding image content.

8. The electronic device according to claim 5, wherein the method further comprises:
   after completion of the training of the multi-modal pre-training model, fine-tuning, for any downstream task, the multi-modal pre-training model according to the training data corresponding to the downstream task.

9. A non-transitory computer-readable storage medium comprising instructions, which, when executed by a computer, cause the computer to carry out a multi-modal pre-training model acquisition method, which comprises:

determining, for each image-text pair as training data, to-be-processed fine-grained semantic words in the text;

masking the to-be-processed fine-grained semantic words; and training the multi-modal pre-training model using the training data with the fine-grained semantic words masked, wherein determining the to-be-processed fine-grained semantic words in the text comprises:

acquiring a scene graph corresponding to the text, wherein the scene graph comprises: entity nodes, attribute tuples and relationship triples, each attribute tuple is composed of one entity node and one attribute node, and each relationship triple is composed of two entity nodes and one relationship node;

selecting a predetermined number of entity nodes, attribute tuples and relationship triples from the scene graph, and taking entity words in the text corresponding to the selected entity nodes, attribute words in the text corresponding to attribute nodes in the selected attribute tuples, and relationship words in the text corresponding to relationship nodes in the selected relationship triples, as the to-be-processed fine-grained semantic words.

10. The non-transitory computer-readable storage medium according to claim 9, wherein the selecting the predetermined number of entity nodes, attribute tuples and relationship triples from the scene graph comprises:

determining a number of nodes to be selected according to a total number of nodes comprised in the scene graph as the predetermined number; and randomly selecting the predetermined number of entity nodes, attribute tuples and relationship triples from the scene graph.

11. The non-transitory computer-readable storage medium according to claim 9, wherein training tasks of the multi-modal pre-training model comprise: entity prediction, attribute prediction and relationship prediction; and wherein the multi-modal pre-training model predicts masked words in the text according to a context of the text and corresponding image content.

\* \* \* \* \*